United States Patent
Akula et al.

(10) Patent No.: US 10,929,264 B2
(45) Date of Patent: Feb. 23, 2021

(54) MEASURING EFFECTIVE UTILIZATION OF A SERVICE PRACTITIONER FOR TICKET RESOLUTION VIA A WEARABLE DEVICE

(71) Applicant: International Business Machines Corporation, Armonk, NY (US)

(72) Inventors: Arjun R. Akula, Bangalore (IN); Gargi B. Dasgupta, Bangalore (IN); Vijay Ekambaram, Bangalore (IN); Ramasuri Narayanam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 618 days.

(21) Appl. No.: 15/265,126

(22) Filed: Sep. 14, 2016

(65) Prior Publication Data

US 2018/0074876 A1    Mar. 15, 2018

(51) Int. Cl.
*G06F 11/07* (2006.01)
*G06F 11/30* (2006.01)
(Continued)

(52) U.S. Cl.
CPC ...... *G06F 11/3495* (2013.01); *G06F 11/0709* (2013.01); *G06F 11/0784* (2013.01); *G06Q 10/0639* (2013.01); *G07C 1/00* (2013.01)

(58) Field of Classification Search
CPC ............ G06F 11/3419; G06F 11/3495; G06F 11/0709; G06F 11/3006; G06F 11/0784;
(Continued)

(56) References Cited

U.S. PATENT DOCUMENTS 5,581,490 A * 12/1996 Ferkinhoff .............. G01S 11/14
702/181
6,990,238 B1 * 1/2006 Saffer ................... G06K 9/6218
382/224
(Continued)

FOREIGN PATENT DOCUMENTS

CN         104780217 A        7/2015

OTHER PUBLICATIONS

Maiti, Anindya, et al., 'Smartwatch-Based Keystroke Inference Attacks and Context-Aware Protection Mechanisms,' paper presented at Asia CCS 2016, Xi'an, China, May 30-Jun. 3, 2016, pp. 795-806. (Year: 2016).*

(Continued)

*Primary Examiner* — John E Breene
*Assistant Examiner* — Jeffrey P Aiello
(74) *Attorney, Agent, or Firm* — Ryan, Mason & Lewis, LLP

(57) ABSTRACT

Methods, systems, and computer program products for measuring effective utilization of a service practitioner for ticket resolution via a wearable device are provided herein. A computer-implemented method includes determining one or more keywords related to multiple information technology action item categories; matching the determined keywords to a set of keystroke data, wherein the keystroke data are captured (i) by a remote device associated with an information technology action item practitioner (ii) over a fixed duration of time; computing, based on said matching the amount of the fixed duration of time spent by the information technology action item practitioner attempting to resolve an information technology action item from among the multiple categories; and outputting the computed amount of time to at least one user.

15 Claims, 5 Drawing Sheets

(51) Int. Cl.
*G06F 11/34* (2006.01)
*G07C 1/00* (2006.01)
*G06Q 10/06* (2012.01)

(58) Field of Classification Search
CPC ......... G06Q 10/063114; G06Q 30/016; G06Q 10/06398; G06Q 10/06; G07C 1/00
USPC .............................................. 705/7.15, 7.42
See application file for complete search history.

(56) References Cited

U.S. PATENT DOCUMENTS

| | | | |
|---|---|---|---|
| 7,146,381 B1* | 12/2006 | Allen | G06F 17/2705 |
| 7,822,720 B2* | 10/2010 | Choi | G06F 17/30864 |
| | | | 707/688 |
| 8,489,941 B2 | 7/2013 | Anand et al. | |
| 9,020,848 B1 | 4/2015 | Ridge et al. | |
| 9,420,103 B1* | 8/2016 | Varman | H04W 4/12 |
| 9,495,446 B2* | 11/2016 | Martin | G06F 17/30702 |
| 2005/0172734 A1* | 8/2005 | Alsio | G06F 3/014 |
| | | | 73/865.4 |
| 2006/0190725 A1* | 8/2006 | Huang | G06F 11/3438 |
| | | | 713/168 |
| 2006/0265090 A1* | 11/2006 | Conway | H04M 3/42221 |
| | | | 700/94 |
| 2007/0219929 A1* | 9/2007 | Steinbach | G06Q 10/06 |
| | | | 705/80 |
| 2008/0120495 A1* | 5/2008 | Aharonson | G06F 9/451 |
| | | | 712/226 |
| 2008/0192923 A1* | 8/2008 | Ruckart | H04M 3/5231 |
| | | | 379/265.09 |
| 2009/0049029 A1* | 2/2009 | Choi | G06F 17/3064 |
| 2009/0063175 A1* | 3/2009 | Hibbets | G06F 17/30867 |
| | | | 705/16 |
| 2010/0004941 A1* | 1/2010 | Chang | G06Q 10/06 |
| | | | 705/1.1 |
| 2011/0098834 A1* | 4/2011 | Couronne | G06Q 10/06 |
| | | | 700/100 |
| 2011/0179009 A1* | 7/2011 | Nam | G06Q 30/02 |
| | | | 707/708 |
| 2011/0314440 A1* | 12/2011 | Singhal | G06F 8/77 |
| | | | 717/101 |
| 2013/0293551 A1* | 11/2013 | Erez | G06T 11/206 |
| | | | 345/440 |
| 2013/0304802 A1* | 11/2013 | Assadollahi | G06F 17/30867 |
| | | | 709/203 |
| 2014/0108527 A1* | 4/2014 | Aravanis | G06Q 50/01 |
| | | | 709/204 |
| 2014/0228005 A1* | 8/2014 | Huang | H04M 3/42059 |
| | | | 455/414.1 |
| 2015/0113628 A1* | 4/2015 | Deshmukh | H04L 41/5074 |
| | | | 726/10 |
| 2015/0186612 A1* | 7/2015 | Gartseev | G06F 19/3418 |
| | | | 702/19 |
| 2015/0242541 A1* | 8/2015 | Cerny | G06F 17/5045 |
| | | | 716/106 |
| 2016/0012451 A1* | 1/2016 | Shanmugam | G06Q 30/016 |
| | | | 705/304 |
| 2016/0063996 A1* | 3/2016 | Chen | G10L 15/12 |
| | | | 704/255 |
| 2016/0125348 A1 | 5/2016 | Dyer et al. | |
| 2016/0171395 A1* | 6/2016 | Lippow | G06Q 10/025 |
| | | | 705/6 |
| 2017/0154293 A1* | 6/2017 | Baduge | G10L 15/10 |
| 2017/0262621 A1* | 9/2017 | Venkataraman | G06F 21/335 |

OTHER PUBLICATIONS

Liu, Xiangyu, et al., 'When Good Becomes Evil: Keystroke Inference with Smartwatch', paper presented at ACM CCS 2015, Denver, CO, Oct. 12-16, 2015, entire document (Year: 2015).*

U.S. Appl. No. 14/881,568, filed Oct. 13, 2015 entitled, Capturing and Identifying Important Steps During the Ticket Resolution Process.

Green, NewsMail, "Why Your Boss May Soon be Giving You a Smart Watch," http://www.news-mail.com.au/news/why-your-boss-may-soon-be-giving-you-smartwatch/2740619/, Aug. 14, 2015.

Green, Independent, "Wearable Technology: Latest Devices Allow Employers to Track Behaviour of Their Workers," http://www.independent.co.uk/life-style/gadgets-and-tech/news/wearable-technology-latest-devices-allow-employers-to-track-behaviour-of-their-workers-10454342.html, Aug. 13, 2015.

Wang et al., MoLe: Motion Leaks Through Smart-Watch Sensors, Mobicom, Sep. 7-11, 2015.

Robertson, D., ECE Illinois, https://www.ece.illinois.edu/newsroom/article/11762, Sep. 10, 2015.

* cited by examiner

US 10,929,264 B2

MEASURING EFFECTIVE UTILIZATION OF A SERVICE PRACTITIONER FOR TICKET RESOLUTION VIA A WEARABLE DEVICE

FIELD

The present application generally relates to information technology (IT), and, more particularly, to ticket resolution technology.

BACKGROUND

Documenting statistics related to ticket resolution processes is an important task for improving the efficiency of IT service management. Such statistics can include, for example, the amount of time taken to solve high-priority tickets, an aggregated view of the time taken to solve different categories of tickets, etc. However, existing ticket resolution management approaches commonly include documenting such statistics via manual processes which lack completeness and clarity. Additionally, other existing approaches can include utilizing intrusive techniques that interfere and/or violate user/employee privacy.

SUMMARY

In one embodiment of the present invention, techniques for measuring effective utilization of a service practitioner for ticket resolution via a wearable device are provided. An exemplary computer-implemented method can include steps of determining one or more keywords related to multiple information technology action item categories; matching the determined keywords to a set of keystroke data, wherein the keystroke data are captured (i) by a remote device associated with an information technology action item practitioner (ii) over a fixed duration of time; computing, based on the matching, the amount of the fixed duration of time spent by the information technology action item practitioner attempting to resolve an information technology action item from among the multiple categories; and outputting the computed amount of time to at least one user.

In another embodiment of the invention, an exemplary system can include a mobile computing device and a server. In such a system, the mobile computing device includes a memory and at least one processor coupled to the memory and configured for tracking keystroke data generated by an information technology action item practitioner over a fixed duration of time, and transmitting the keystroke data over a network to a server. Additionally, in such a system, the server includes a memory and at least one processor coupled to the memory and configured for matching the keystroke data to one or more keywords related to multiple information technology action item categories; computing, based on matching, the amount of the fixed duration of time spent by the information technology action item practitioner attempting to resolve an information technology action item from among the multiple categories; and outputting the computed amount of time to at least one user.

In yet another embodiment of the invention, an exemplary computer-implemented method can include steps of constructing one or more contextual keywords related to multiple information technology action item categories, monitoring the keystrokes of an information technology action item practitioner over a fixed duration of time, and identifying one or more matches between the constructing contextual keywords and the monitored keystrokes. Such a method can also include classifying the identified matches into one or more of the multiple information technology action item categories, calculating, from the fixed duration of time, the amount of time spent by the information technology action item practitioner attempting to resolve an information technology action item from among the multiple categories by aggregating the amounts of time corresponding to the classified matches, and outputting the calculated amount of time to at least one user.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes measuring effective utilization of a service practitioner for ticket (also referred to herein as an information technology action item) resolution via a wearable device. At least one embodiment of the invention includes implementing a wearable device (such as a smart watch) for measuring the effectiveness of time utilization by an employee (also referred to herein as a service practitioner (SP) or an information technology action item practitioner) during a ticket resolution process. Such an embodiment can include constructing contextual keywords of tickets for each of multiple ticket categories, followed by monitoring the keystrokes of the employee as well as the employee's hand movement. As further detailed herein, such monitoring can be carried out, for example, by an employee passive monitoring (EPM) client module resident on the employee's wearable device. The data (user fine-hand movement data such as keystrokes, for example) captured via the monitoring process can subsequently be transmitted to an EPM server.

Additionally, one or more embodiments of the invention can also include retrieving matches between the keystrokes captured via the monitoring process and domain keywords (of ticket categories) stored by the EPM server, and classifying any such matches into one or more established ticket categories. Such an embodiment can also include computing the aggregated amount of time spent by the employee on each ticket category, based on the classification of the above-noted matches. Further, at least one embodiment of the invention can include disambiguating movement data captured (via the monitoring process) within the context of the ticket categories being resolved to compute the aggregated time spent by employee on each ticket category. Disambiguating movement data can be carried out, for example, using one or more probability-based techniques to capture the most likely context.

Also, as further detailed herein, one or more embodiments of the invention can include determining various employment-related times (such as, for example, clock-in time and clock-out time) via utilization of the user's wearable device. Additionally, at least one embodiment of the invention can include calculating the work time efficiency of the user based on the time spent by user on resolving each ticket category.

Figure 1:
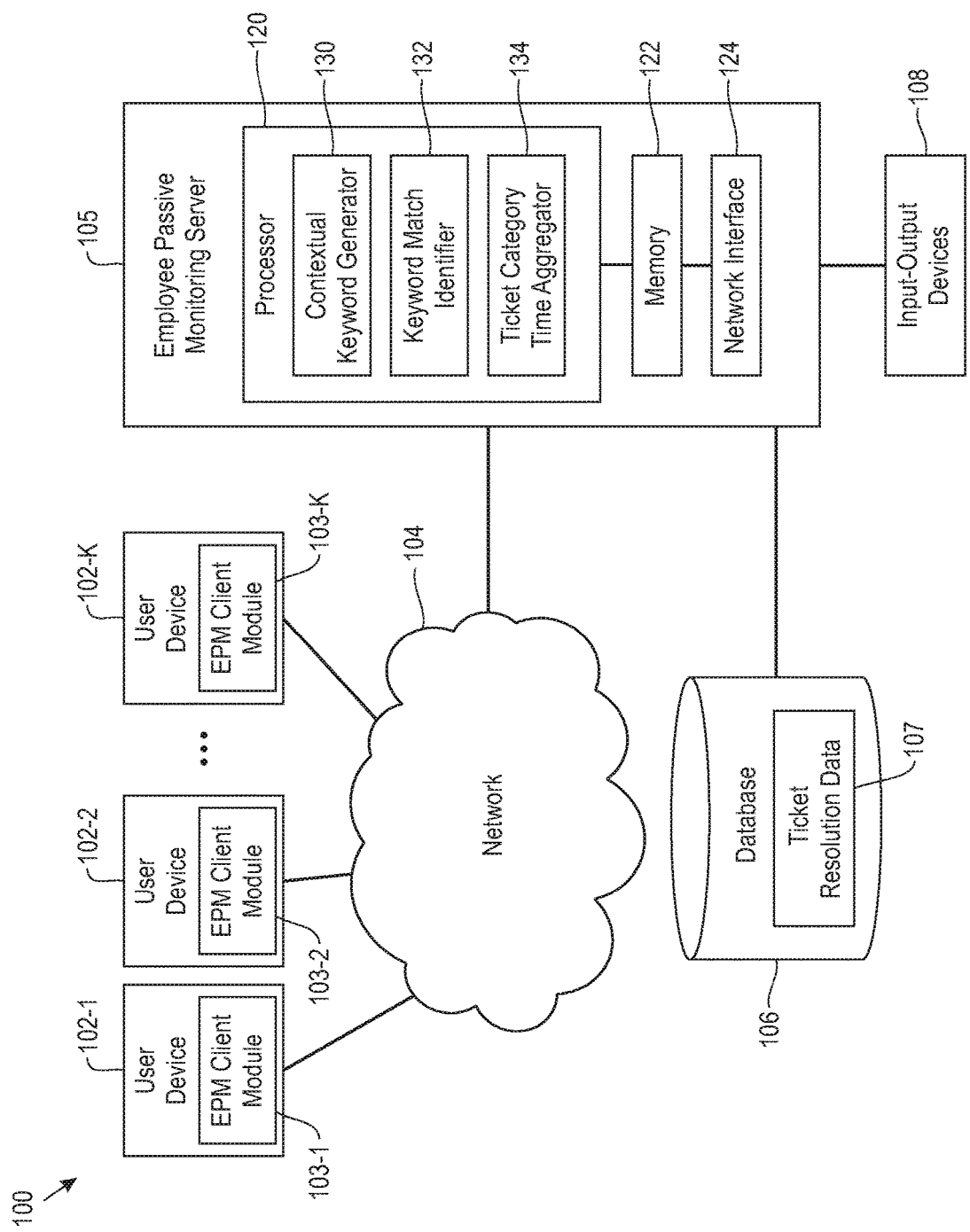
FIG. 1 is a diagram illustrating system architecture, according to an exemplary embodiment of the invention.

FIG. 1 is a diagram illustrating system architecture, according to an embodiment of the invention. By way of illustration, FIG. 1 depicts a computer network 100 configured in accordance with an illustrative embodiment of the invention. The computer network 100 comprises a plurality of user devices 102-1, 102-2, . . . 102-K, collectively referred to herein as user devices 102, which each includes an EPM client module (103-1, 103-2, and 103-K, respectively; collectively referred to herein as EPM client modules 103). The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is an EPM server 105.

The user devices 102 may comprise, for example, wearable devices such as smart watches. The user devices 102 may also comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi™ or WiMAX network, or various portions or combinations of these and other types of networks. The computer network 100 in some embodiments therefore comprises combinations of multiple different types of networks each comprising processing devices configured to communicate using internet protocol (IP) or other related communication protocols.

The EPM server 105 has an associated database 106 configured to store ticket resolution data 107 (which can include, for example, one or more contextual keywords).

The database 106 in the present embodiment is implemented using one or more storage systems associated with the EPM server 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the EPM server 105 are input-output devices 108, which illustratively comprise keyboards, displays or other types of input-output devices in any combination. Such input-output devices are used to support one or more user interfaces to the EPM server 105, as well as to support communication between the EPM server 105 and other related systems and devices not explicitly shown.

The EPM server 105 in the FIG. 1 embodiment is assumed to be implemented using at least one processing device. Each such processing device generally comprises at least one processor and an associated memory, and implements one or more functional modules for controlling certain features of the EPM server 105.

More particularly, the EPM server 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the EPM server 105 to communicate over the network 104 with the user devices 102, and illustratively comprises one or more conventional transceivers.

The processor 120 further comprises a contextual keyword generator 130, a keyword match identifier 132, and a ticket category time aggregator 134.

It is to be appreciated that this particular arrangement of modules 130, 132, and 134 illustrated in the processor 120 of the FIG. 1 embodiment is presented by way of example only, and alternative arrangements can be used in other embodiments. For example, the functionality associated with the modules 130, 132, and 134 in other embodiments can be combined into a single module, or separated across a larger number of modules. As another example, multiple distinct processors can be used to implement different ones of the modules 130, 132, and 134 or portions thereof.

At least portions of the contextual keyword generator 130, keyword match identifier 132, and ticket category time aggregator 134 may be implemented at least in part in the form of software that is stored in memory 122 and executed by processor 120.

It is to be understood that the particular set of elements shown in FIG. 1 for automatically measuring effective utilization of service practitioners for ticket resolution involving user devices 102 of computer network 100 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the EPM server 105 can be eliminated, and associated elements such as contextual keyword generator 130, keyword match identifier 132, and ticket category time aggregator 134 can be implemented elsewhere in the computer network 100.

An exemplary process utilizing contextual keyword generator 130, keyword match identifier 132, and ticket category time aggregator 134 of the EPM server 105 in computer network 100 will be described in more detail herein.

For example, the contextual keyword generator 130 can identify and learn possible common keywords with respect to each of multiple ticket categories to construct contextual keywords of tickets (CKT). Such actions, in one or more embodiments of the invention, can be carried out offline. By way of illustration, consider an example set of tickets $T_{ai}$ belonging to category A. Accordingly, EPM client modules 103 can capture keywords typed by users (via user devices 102) while resolving tickets of category A, and the contextual keyword generator 130 can subsequently generate a list of words that commonly occur while solving tickets belonging to category A. Similarly, considering another example set of tickets $T_{bi}$ belonging to category B, EPM client modules 103 can capture keywords typed by users (via user devices 102) while resolving tickets of category B, and the contextual keyword generator 130 can subsequently generate a list of words that commonly occur while solving tickets belonging to category B.

Additionally, once a user (worker, employee, etc.) accepts to resolve a ticket, the EPM server 105 can activate the EPM client module 103 in the given user's device 102. As such, one or more embodiments of the invention can include determining the classification categories of the tickets that are assigned to a user. In such an embodiment, the input can include tickets $T_1, \ldots T_k$ that are assigned to the user. Additionally, as noted, once the user accepts to resolve a ticket, the EPM server 105 starts the EPM client module 103 in the user's device 102, and for each accepted ticket $T_j$, the classification category $C_i$ is determined and/or identified. Determining the classification category of the ticket can be carried out, for example, using one or more linear weight-based classification algorithms. Accordingly, such an embodiment can include outputting tickets $T_1, \ldots T_k$ and the categories $[C_p \ldots C_q]$ corresponding thereto.

Also, in at least one embodiment of the invention, the EPM client module 103 can track the user's keystrokes by monitoring the user's hand movement over a keyboard. The EPM client module then pushes such tracked keystrokes to the EPM server 105. One or more embodiments of the invention can also include implementing one or more post-processing techniques to the captured/tracked keystrokes to relate the data to the ticket-resolution context.

By way of example, capturing the words typed by a user via the user's device 102 (such as a smart watch) can include an input of a set of tickets $T_1, \ldots T_k$ and the categories $[C_p \ldots C_q]$ corresponding thereto, as well as the start time $t_s$ and end time $t_e$ of the user ticket resolution process. Additionally, the given EPM client module 103 can list all recorded/tracked/captured words $w_1, \ldots w_n$ typed by the user between time $t_i$ and $t_j$ and subsequently output such recorded words $w_1, \ldots w_n$ between time $t_s$ and $t_e$ to the EPM server 105.

Subsequently, the keyword match identifier 132 matches each word (retrieved from the EPM client module 103) to one or multiple words based on CKT (generated by the contextual keyword generator 130). Additionally, the keyword match identifier 132 can also identify one or more likely word sequences from the captured data by determining one or more meaningful sequences from the word combinations in the context of ticket categories and their CKT. Ultimately, the (captured/recorded) words are classified into one of the ticket categories.

One or more embodiments of the invention can include disambiguating recorded words. In connection with such an embodiment, input can include all recorded $w_1, \ldots w_n$ between time $t_s$ and $t_e$. By way of illustration, assume that $\{w\}_{ij}$ represents the words typed between time $t_i$ and $t_j$, $[C_p \ldots C_q]$ represents the corresponding categories of the accepted tickets, and $w_{Ci}$ represents dictionary words, wherein $C_i \in [C_p \ldots C_q]$. Accordingly, such an embodiment can include using dictionary words $w_{Ci}$ to disambiguate the recorded words $w_1, \ldots w_n$ (using, for example, a Viterbi algorithm and error correction) to map to the most probable category $C_i$, wherein $C_i \in [C_p \ldots C_q]$. As noted, a Viterbi algorithm can be implemented to capture the most likely context in terms of transition probabilities and emission probabilities. Further, at least one embodiment of the invention can include using iterative Viterbi decoding to find the most likely word sequence. Ultimately, one or more embodiments of the invention can include generating an output, for every timeframe $t \in [t_i \ldots t_j]$, that includes the mapping of words $\{w\}_{ij}$ to $C_r \in [C_p \ldots C_q]$.

Additionally, at least one embodiment of the invention can include implementing a heuristic in connection with ticket-level monitoring. For example, if there are tickets of the same category open at the same time, such an embodiment can include determining whether there is additional contextual information inherent in the ticket text (such as, for example, a server/application name) that can be used to further disambiguate what the user typed. Such a heuristic can utilize knowledge about the managed service environment (for example, a user's text indicates work on an IT element that is closely related to an element mentioned in the ticket).

Also, as detailed herein, the ticket category time aggregator 134 aggregates the time spent by the user on each ticket category. Such aggregating assists in computing an activity trace that represents the extent of the user's time utilized for resolving the tickets at hand, without manual input from the user. For example, at least one embodiment of the invention can include computing a work time utilization graph. The input for such a computation can include, for each time slot t∈[$t_s$ ... $t_e$], the most probable classification category $C_r$ on which the user is working. The output can then include the effort time graph of the user based on the predicted categories [$C_p$ ... $C_q$]. In generating such an output, at least one embodiment of the invention can include plotting predicted categories [$C_p$ ... $C_q$] against the time slots (t) to obtain the work time utilization graph. This graph assists in visualizing the overall time spent by the user on resolving tickets in each ticket category.

Figure 2:
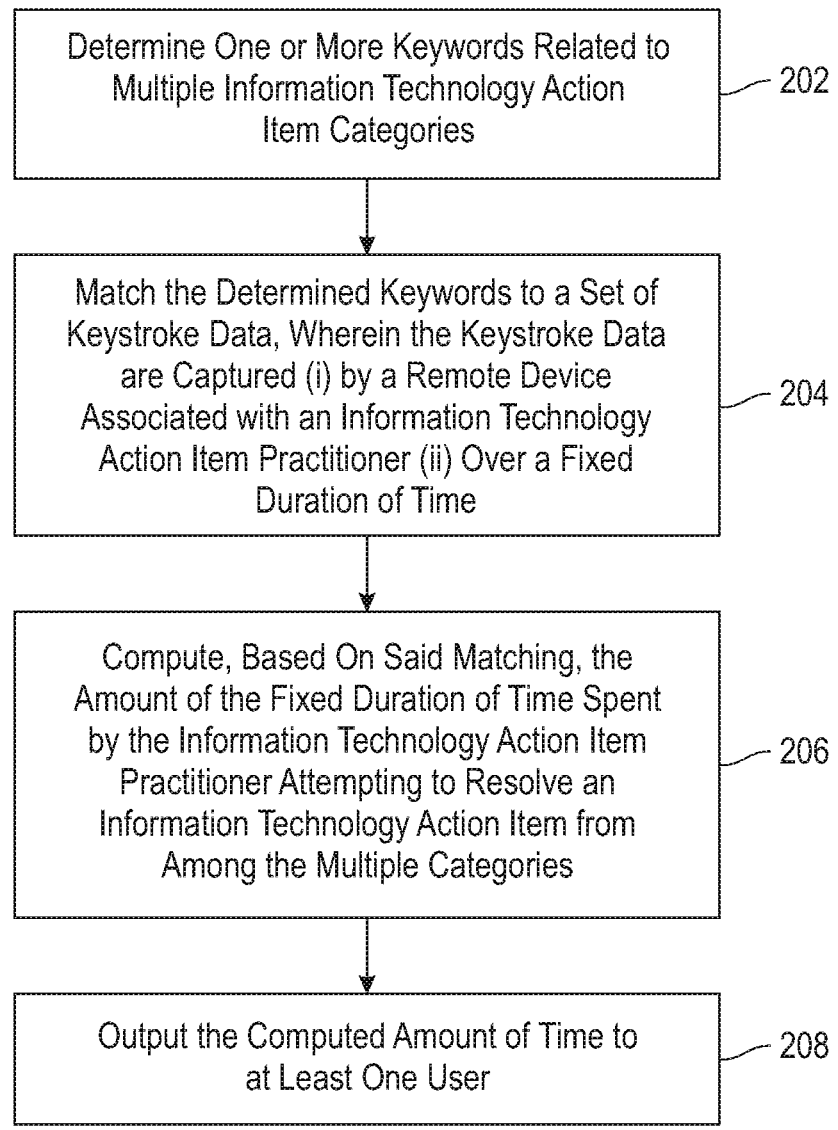
FIG. 2 is a flow diagram illustrating techniques according to an embodiment of the invention.

FIG. 2 is a flow diagram illustrating techniques according to an embodiment of the present invention. Step 202 includes determining one or more keywords related to multiple information technology action item categories. The keywords can include a collection of words that are commonly used while resolving information technology action items of a given information technology action item category.

Step 204 includes matching the determined keywords to a set of keystroke data, wherein the keystroke data are captured (i) by a remote device associated with an information technology action item practitioner (ii) over a fixed duration of time. At least one embodiment of the invention can additionally include applying one or more post-processing techniques to the keystroke data to relate the keystroke data to an information technology action item context.

The remote device can include a wearable device (such as a smart watch), and in one or more embodiments of the invention, the wearable device is worn by the information technology action item practitioner. At least one embodiment of the invention can also include activating the remote device associated with an information technology action item practitioner in response to acceptance of an information technology action item by the information technology action item practitioner.

Step 206 includes computing, based on said matching, the amount of the fixed duration of time spent by the information technology action item practitioner attempting to resolve an information technology action item from among the multiple categories. The computing step can include computing an activity trace that represents the extent of the fixed duration of time utilized for resolving information technology action items. Step 208 includes outputting the computed amount of time to at least one user.

The techniques depicted in FIG. 2 can also include determining one or more word sequences from the keystroke data based on one or more word combinations in the determined keywords. Additionally, at least one embodiment of the invention can include classifying one or more items of the keystroke data into one or more of the multiple information technology action item categories. Also, software implementing the techniques depicted in FIG. 2 can be provided as a service in a cloud environment.

Also, an additional embodiment of the invention includes a system that includes a mobile computing device (such as a wearable device including, for example, a smart watch) and a server. In such a system, the mobile computing device includes a memory and at least one processor coupled to the memory and configured for tracking keystroke data generated by an information technology action item practitioner over a fixed duration of time, and transmitting the keystroke data over a network to a server. Additionally, in such a system, the server includes a memory and at least one processor coupled to the memory and configured for matching the keystroke data to one or more keywords related to multiple information technology action item categories; computing, based on said matching the amount of the fixed duration of time spent by the information technology action item practitioner attempting to resolve an information technology action item from among the multiple categories; and outputting the computed amount of time to at least one user.

Additionally, at least one embodiment of the invention can include constructing one or more contextual keywords related to multiple information technology action item categories, monitoring the keystrokes of an information technology action item practitioner over a fixed duration of time, and identifying one or more matches between the constructing contextual keywords and the monitored keystrokes. Such an embodiment can also include classifying the identified matches into one or more of the multiple information technology action item categories, calculating, from the fixed duration of time, the amount of time spent by the information technology action item practitioner attempting to resolve an information technology action item from among the multiple categories by aggregating the amounts of time corresponding to the classified matches, and outputting the calculated amount of time to at least one user.

At least one embodiment of the invention (such as the techniques depicted in FIG. 2, for example), can include implementing a service via a transmission server to receive data from a data source and send selected data to users (for example, at a provided destination address of a wireless device (such as a number for a cellular phone, etc.)). The transmission server includes a memory, a transmitter, and a microprocessor. Such an embodiment of the invention can also include providing a viewer application to the users for installation on their individual devices. Additionally, in such an embodiment of the invention, after a user enrolls, the service receives tracked keystrokes sent from a data source to the transmission server. The server can process the information, for example, based upon user-provided user preference information that is stored in memory on the server. Subsequently, an alert is generated containing an aggregated time computation for each of one or more ticket categories. The alert can be formatted into data blocks, for example, based upon any provided alert format preference information. Subsequently, the alert and/or formatted data blocks are transmitted over a data channel to the user's wireless device. After receiving the alert, the user can connect the wireless device to the user's computer, whereby the alert causes the user's computer to automatically launch the application provided by the service to display the alert. When connected to the Internet, the user may then use the viewer application (for example, via clicking on a URL associated with the data source provided in the alert) to facilitate a connection from the remote user computer to the data source over the Internet for additional information.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 3:
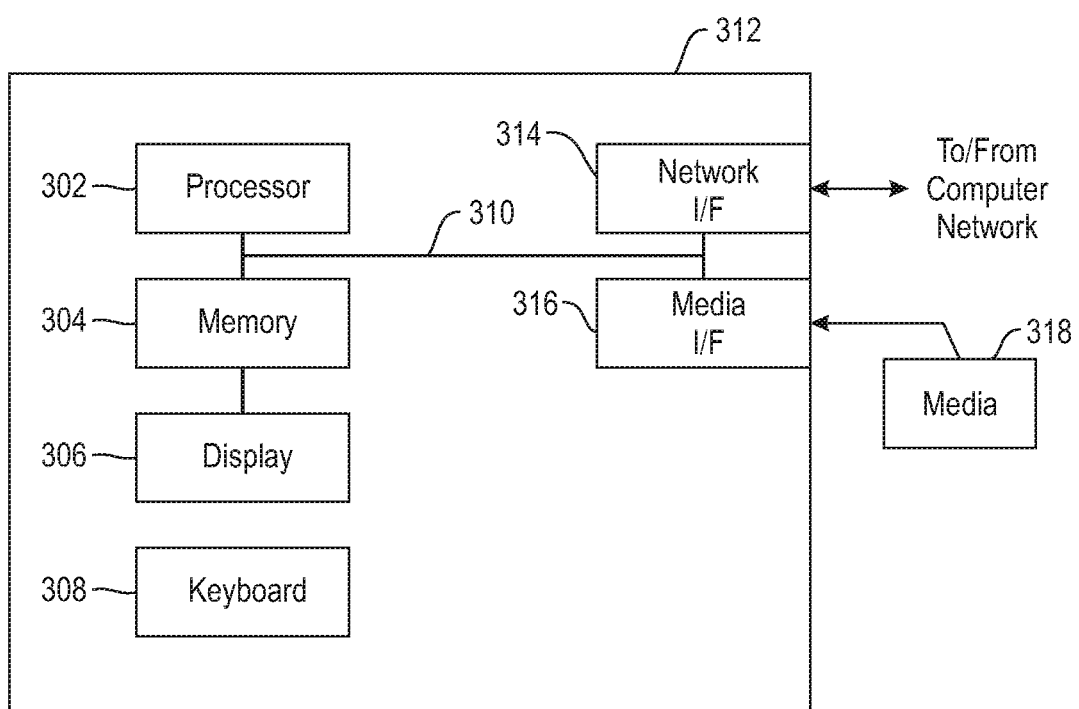
FIG. 3 is a system diagram of an exemplary computer system on which at least one embodiment of the invention can be implemented.

Additionally, an embodiment of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
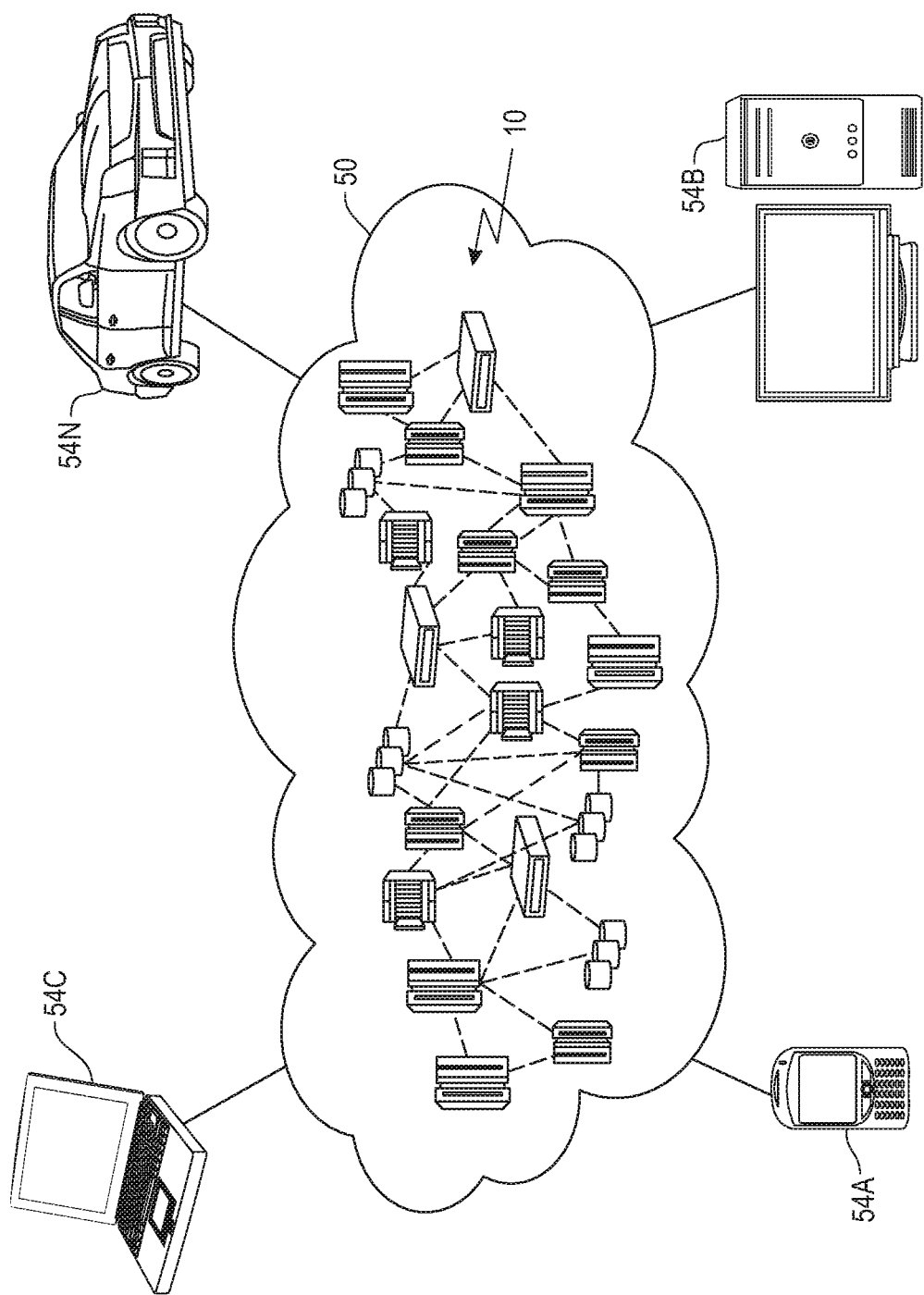
FIG. 4 depicts a cloud computing environment, according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
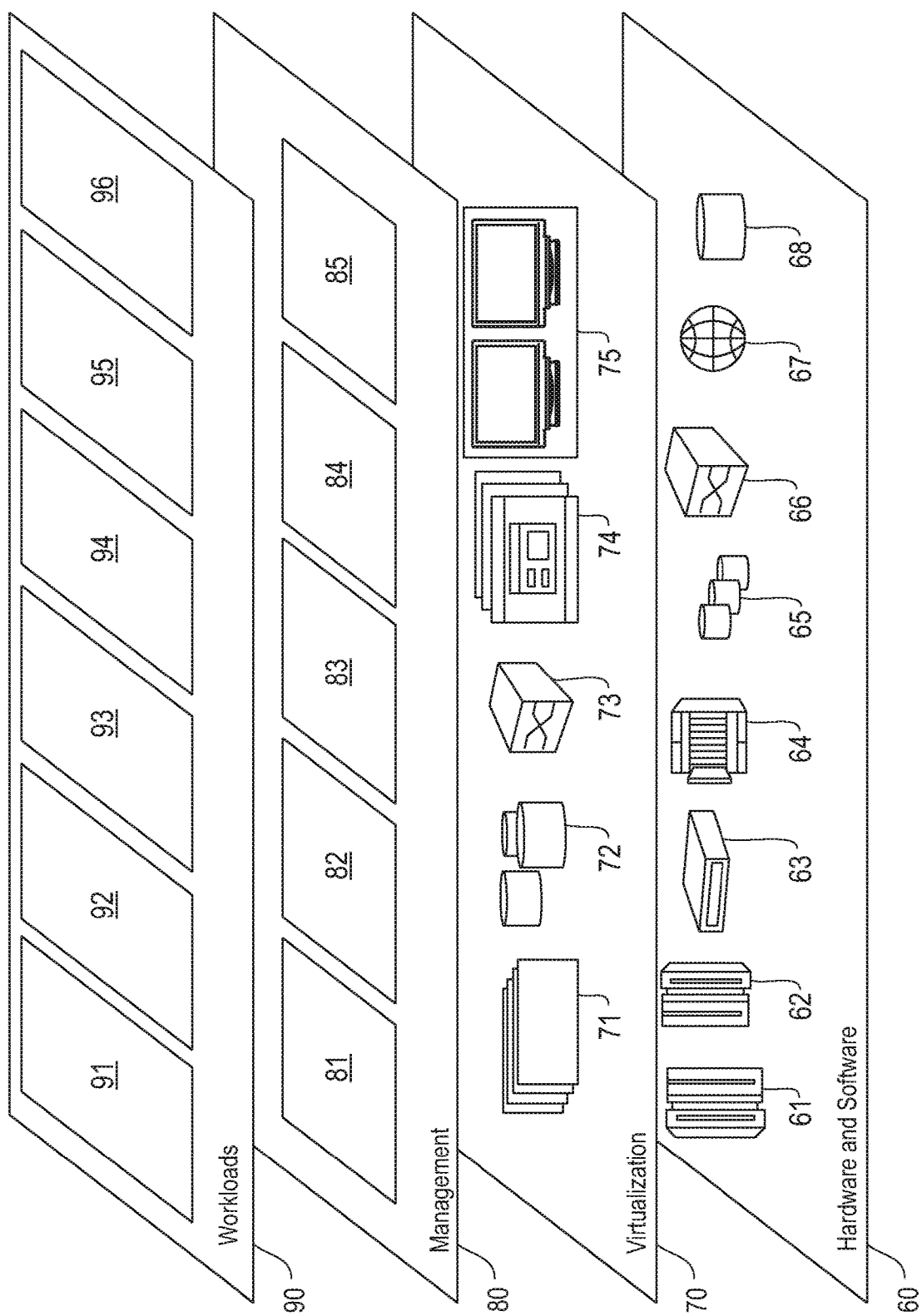
FIG. 5 depicts abstraction model layers, according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and measuring effective utilization of a service practitioner for ticket resolution 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, constructing contextual keywords of tickets for each ticket category followed by monitoring of keystrokes of user's hand movement via a monitoring module in the user's wearable device.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   determining one or more keywords related to multiple information technology action item categories;
   classifying an information technology action item from among the multiple categories, wherein said classifying comprises using one or more linear weight-based classification algorithms;
   activating a remote device associated with an information technology action item practitioner in response to acceptance of an information technology action item by the information technology action item practitioner;
   matching the determined keywords to a set of keystroke data, wherein the keystroke data and hand movement of the information technology action item practitioner are captured (i) by the remote device associated with the information technology action item practitioner (ii) over a fixed duration of time, wherein said matching comprises applying one or more post-processing techniques to the keystroke data to relate the keystroke data to an information technology action item context, and wherein said applying the one or more post-processing techniques comprises:
      disambiguating the keystroke data by applying at least one Viterbi algorithm to the keystroke data and the hand movement and relating the keystroke data to one or more portions of the information technology action item context in terms of one or more transition probabilities and one or more emission probabilities;
   computing, based on said matching, the amount of the fixed duration of time spent by the information technology action item practitioner attempting to resolve the classified information technology action item;
   calculating a work time efficiency value attributed the information technology action item practitioner based on (i) the computed amount of time spent by the information technology action item practitioner and (ii) a time value associated with information technology action item practitioners resolving information technology action items from a category associated with the classified information technology action item; and
   outputting (i) the computed amount of time and (ii) the calculated work time efficiency value to at least one user;
   wherein the method is carried out by at least one computing device.

2. The computer-implemented method of claim 1, wherein the remote device comprises a wearable device.

3. The computer-implemented method of claim 2, wherein the wearable device is worn by the information technology action item practitioner.

4. The computer-implemented method of claim 2, wherein the wearable device comprises a smart watch.

5. The computer-implemented method of claim 1, comprising:
   determining one or more word sequences from the keystroke data based on one or more word combinations in the determined keywords.

6. The computer-implemented method of claim 1, comprising:
   classifying one or more items of the keystroke data into one or more of the multiple information technology action item categories.

7. The computer-implemented method of claim 1, wherein said computing comprises computing an activity trace that represents the extent of the fixed duration of time utilized for resolving information technology action items.

8. A computer program product comprising a non-transitory computer readable storage medium having program instructions embodied therewith, the program instructions executable by a device to cause the device to:
   determine one or more keywords related to multiple information technology action item categories;
   classify an information technology action item from among the multiple categories, wherein said classifying comprises using one or more linear weight-based classification algorithms;
   activate a remote device associated with an information technology action item practitioner in response to acceptance of an information technology action item by the information technology action item practitioner;
   match the determined keywords to a set of keystroke data, wherein the keystroke data and hand movement of the information technology action item practitioner are captured (i) by the remote device associated with the information technology action item practitioner (ii) over a fixed duration of time, wherein said matching comprises applying one or more post-processing techniques to the keystroke data to relate the keystroke data to an information technology action item context, and wherein said applying the one or more post-processing techniques comprises:
      disambiguating the keystroke data by applying at least one Viterbi algorithm to the keystroke data and the hand movement and relating the keystroke data to one or more portions of the information technology action item context in terms of one or more transition probabilities and one or more emission probabilities;
   compute, based on said matching, the amount of the fixed duration of time spent by the information technology action item practitioner attempting to resolve the classified information technology action item;

calculate a work time efficiency value attributed the information technology action item practitioner based on (i) the computed amount of time spent by the information technology action item practitioner and (ii) a time value associated with information technology action item practitioners resolving information technology action items from a category associated with the classified information technology action item; and output (i) the computed amount of time and (ii) the calculated work time efficiency value to at least one user.

9. The computer program product of claim 8, wherein the program instructions executable by a computing device further cause the computing device to:

determine one or more word sequences from the keystroke data based on one or more word combinations in the determined keywords.

10. The computer program product of claim 8, wherein the program instructions executable by a computing device further cause the computing device to:

classify one or more items of the keystroke data into one or more of the multiple information technology action item categories.

11. A system comprising:

a memory; and at least one processor coupled to the memory and configured for:

determining one or more keywords related to multiple information technology action item categories;

classifying an information technology action item from among the multiple categories, wherein said classifying comprises using one or more linear weight-based classification algorithms;

activating a remote device associated with an information technology action item practitioner in response to acceptance of an information technology action item by the information technology action item practitioner;

matching the determined keywords to a set of keystroke data, wherein the keystroke data and hand movement of the information technology action item practitioner are captured (i) by the remote device associated with the information technology action item practitioner (ii) over a fixed duration of time, wherein said matching comprises applying one or more post-processing techniques to the keystroke data to relate the keystroke data to an information technology action item context, and wherein said applying the one or more post-processing techniques comprises:

disambiguating the keystroke data by applying at least one Viterbi algorithm to the keystroke data and the hand movement and relating the keystroke data to one or more portions of the information technology action item context in terms of one or more transition probabilities and one or more emission probabilities;

computing, based on said matching, the amount of the fixed duration of time spent by the information technology action item practitioner attempting to resolve the classified information technology action item;

calculating a work time efficiency value attributed the information technology action item practitioner based on (i) the computed amount of time spent by the information technology action item practitioner and (ii) a time value associated with information technology action item practitioners resolving information technology action items from a category associated with the classified information technology action item; and outputting (i) the computed amount of time and (ii) the calculated work time efficiency value to at least one user.

12. A system, comprising:

a mobile computing device, comprising (i) a memory and (ii) at least one processor coupled to the memory and configured for:

tracking keystroke data generated by an information technology action item practitioner and hand movement of the information technology action item practitioner over a fixed duration of time; and transmitting the keystroke data over a network to a server; and the server, comprising (i) a memory and (ii) at least one processor coupled to the memory and configured for:

classifying an information technology action item from among the multiple categories, wherein said classifying comprises using one or more linear weight-based classification algorithms;

activating the mobile computing device in response to acceptance of an information technology action item by the information technology action item practitioner;

determining one or more keywords related to multiple information technology action item categories, wherein determining the one or more keywords comprises, for each of the multiple information technology action item categories, (i) capturing one or more keywords typed by one or more information technology action item practitioners while resolving information technology action items of the given information technology action item category, and (ii) generating, based at least in part on said capturing, a list of one or more keywords that commonly occur while resolving information technology action items of the given information technology action item category;

matching the keystroke data to the one or more determined keywords, wherein said matching comprises applying one or more post-processing techniques to the keystroke data to relate the keystroke data to an information technology action item context, and wherein said applying the one or more post-processing techniques comprises:

disambiguating the keystroke data by applying at least one Viterbi algorithm to the keystroke data and the hand movement and relating the keystroke data to one or more portions of the information technology action item context in terms of one or more transition probabilities and one or more emission probabilities;

computing, based on said matching, the amount of the fixed duration of time spent by the information technology action item practitioner attempting to resolve the classified information technology action item;

calculating a work time efficiency value attributed the information technology action item practitioner based on (i) the computed amount of time and (ii) a time value associated with information technology action item practitioners resolving information technology action items from a category associated with the classified information technology action item; and outputting (i) the computed amount of time and (ii) the calculated work time efficiency value to at least one user.

13. The system of claim 12, wherein the mobile computing device comprises a wearable device.

14. The system of claim 13, wherein the wearable device comprises a smart watch.

15. A computer-implemented method, comprising:
constructing one or more contextual keywords related to multiple information technology action item categories, wherein constructing the one or more contextual keywords comprises, for each of the multiple information technology action item categories, (i) capturing one or more keywords typed by one or more information technology action item practitioners while resolving information technology action items of the given information technology action item category, and (ii) generating, based at least in part on said capturing, a list of one or more keywords that commonly occur while resolving information technology action items of the given information technology action item category;
classifying an information technology action item from among the multiple categories, wherein said classifying comprises using one or more linear weight-based classification algorithms;
activating a remote device associated with an information technology action item practitioner in response to acceptance of an information technology action item by the information technology action item practitioner;
monitoring, via the remote device, the keystrokes of the information technology action item practitioner and hand movement of the information technology action item practitioner over a fixed duration of time;
identifying one or more matches between the constructed contextual keywords and the monitored keystrokes, wherein said identifying one or more matches comprises applying one or more post-processing techniques to the monitored keystrokes to relate the monitored keystrokes to an information technology action item context, and wherein said applying the one or more post-processing techniques comprises:
disambiguating the monitored keystrokes by applying at least one Viterbi algorithm to the monitored keystrokes and the hand movement and relating the monitored keystrokes to one or more portions of the information technology action item context in terms of one or more transition probabilities and one or more emission probabilities;
classifying the identified matches into one or more of the multiple information technology action item categories;
calculating, from the fixed duration of time, the amount of time spent by the information technology action item practitioner attempting to resolve the classified information technology action item by aggregating the amounts of time corresponding to the classified matches;
calculating a work time efficiency value attributed the information technology action item practitioner based on (i) the calculated amount of time and (ii) a time value associated with information technology action item practitioners resolving information technology action items from a category associated with the classified information technology action item; and
outputting (i) the calculated amount of time and (ii) the calculated work time efficiency value to at least one user;
wherein the method is carried out by at least one computing device.

* * * * *